United States Patent
Bang et al.

(10) Patent No.: US 8,581,253 B2
(45) Date of Patent: Nov. 12, 2013

(54) DISPLAY SUBSTRATE AND METHOD OF MANUFACTURING THE SAME

(75) Inventors: Jung-Suk Bang, Guri-si (KR);
Byeong-Hoon Cho, Seoul (KR);
Sung-Hoon Yang, Seoul (KR);
Suk-Won Jung, Goyang-si (KR);
Ki-Hun Jeong, Cheonan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 282 days.

(21) Appl. No.: 12/904,507

(22) Filed: Oct. 14, 2010

(65) Prior Publication Data

US 2011/0169000 A1 Jul. 14, 2011

(30) Foreign Application Priority Data

Jan. 11, 2010 (KR) .................. 10-2010-0002152

(51) Int. Cl.
*H01L 29/10* (2006.01)
*H01L 29/04* (2006.01)
*H01L 31/00* (2006.01)

(52) U.S. Cl.
USPC .......................................... 257/59

(58) Field of Classification Search
None
See application file for complete search history.

(56) References Cited

U.S. PATENT DOCUMENTS

| | | | |
|---|---|---|---|
| 7,889,183 B2* | 2/2011 | Lee et al. ................ | 345/173 |
| 2005/0200296 A1 | 9/2005 | Naugler, Jr. et al. | |
| 2009/0050906 A1 | 2/2009 | Cho et al. | |

FOREIGN PATENT DOCUMENTS

| JP | 2007-310628 | 11/2007 |
|---|---|---|
| JP | 2008-058934 | 3/2008 |
| JP | 2009-047964 | 3/2009 |
| KR | 1020070106278 | 11/2007 |
| KR | 1020080000768 | 1/2008 |
| KR | 1020080044584 | 5/2008 |
| KR | 1020090004282 | 1/2009 |
| KR | 1020090008676 | 1/2009 |
| KR | 1020040095941 | 10/2010 |

* cited by examiner

*Primary Examiner* — Fernando L Toledo
*Assistant Examiner* — Valerie N Newton
(74) *Attorney, Agent, or Firm* — F. Chau & Associates, LLC

(57) ABSTRACT

A display substrate includes a first light blocking pattern formed on a base substrate, a first switching element, a second light blocking pattern formed on the base substrate, and a first sensing element. The first light blocking pattern is configured to block visible light and transmit infrared light. The first switching element includes a first semiconductor pattern, a first source electrode, a first drain electrode, and a first gate electrode. The second light blocking pattern is configured to block the visible light and transmit the infrared light. The first sensing element is configured to detect the infrared light, and includes a second semiconductor pattern, a second source electrode, a second drain electrode, and a second gate electrode.

11 Claims, 15 Drawing Sheets

DISPLAY SUBSTRATE AND METHOD OF MANUFACTURING THE SAME

CROSS-REFERENCE TO RELATED APPLICATION

This application claims priority under 35 U.S.C. §119 to Korean Patent Application No. 2010-0002152, filed on Jan. 11, 2010 in the Korean Intellectual Property Office (KIPO), the entire content of which is incorporated by reference herein.

BACKGROUND

1. Technical Field

Exemplary embodiments of the present invention relate to a display substrate and a method of manufacturing the same. More particularly, exemplary embodiments of the present invention relate to a display substrate used for a display apparatus and a method of manufacturing the same.

2. Discussion of the Related Art

Liquid crystal displays (LCDs) are commonly used in electronic devices such as televisions, computer monitors, laptops, and cellular phones because of their thin size, light weight, and low power consumption. An LCD apparatus includes an LCD panel for displaying an image by using light transmittance of liquid crystal molecules, and a backlight unit disposed under the LCD panel to provide the LCD panel with light.

An LCD panel includes a first substrate, a second substrate, and a liquid crystal layer interposed between the first and second substrate. The first substrate includes a plurality of signal lines, a plurality of thin-film transistors and a pixel electrode. The second substrate faces the first substrate and includes a common electrode.

An LCD panel may function as a touch panel by receiving position data corresponding to an external touch. For example, an LCD panel functioning as a touch panel may be used as an input apparatus by detecting the position of a user's finger or a stylus.

An LCD panel functioning as a touch panel may include a sensing element detecting a touch position of an object making contact with the LCD panel, and a switching element controlling the sensing element. However, because the operating conditions of the sensing element and the switching element are different, the number of manufacturing steps for an LCD panel including a sensing element and a switching element may be increased.

SUMMARY OF THE INVENTION

According to an exemplary embodiment of the present invention, a display substrate includes a first light blocking pattern, a first switching element, a second light blocking pattern and a first sensing element. The first light blocking pattern is formed on a base substrate and is configured to block visible light and transmit infrared light. The first switching element includes a first semiconductor pattern, first source and drain electrodes and a first gate electrode. The first semiconductor pattern is formed on the first light blocking pattern. The first source and drain electrodes are formed on the first semiconductor pattern. The first gate electrode is formed on the first source and drain electrodes. The second light blocking pattern is formed on the base substrate and is configured to block the visible light and transmit the infrared light. The first sensing element is configured to detect the infrared light, and includes a second semiconductor pattern, second source and drain electrodes, and a second gate electrode. The second semiconductor pattern is formed on the second light blocking pattern. The second source and drain electrodes are formed on the second semiconductor pattern. The second gate electrode is formed on the second source and the drain electrodes.

According to another exemplary embodiment of the present invention, a method of manufacturing a display substrate includes forming first and second light blocking patterns on a base substrate, forming a first semiconductor pattern on the first light blocking pattern and a second semiconductor pattern on the second light blocking pattern, forming first source and drain electrodes on the first semiconductor pattern and second source and drain electrodes on the second semiconductor pattern, and forming a first gate electrode on the first source and drain electrodes and a second gate electrode on the second source and drain electrodes. The first and second light blocking patterns are configured to block visible light and transmit infrared light.

According to another exemplary embodiment of the present invention, a method of manufacturing a display substrate includes forming a semiconductor layer on a base substrate and forming a metal layer on the semiconductor layer. The semiconductor layer and the metal layer are patterned to form a first light blocking pattern, a first protection metal layer, a second light blocking pattern and a second protection metal layer. The first protection metal layer is formed on the first light blocking pattern and the second protection metal layer is formed on the second light blocking pattern. A first and second semiconductor pattern is formed on the base substrate to the first semiconductor pattern overlaps with the first light blocking pattern and the second semiconductor pattern overlaps with the second light blocking pattern. A first source electrode and a first drain electrode are formed on the first semiconductor pattern, and a second source electrode and a second drain electrode are formed on the second semiconductor pattern. A first gate electrode and a second gate electrode are formed on the base substrate. The first gate electrode overlaps with the first source and drain electrodes and the second gate electrode overlaps with the second source and drain electrodes.

According to an exemplary embodiment of the present invention, the first sensing element configured to detect the infrared light and the first switching element configured to control the first sensing element may have a double gate structure, resulting in improved driving characteristics of the first sensing element and the first switching element. In addition, bottom gates of the first switching element and the first sensing element may include substantially the same material. Thus, the number of masks used during manufacturing of the display substrate may be decreased.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF EXEMPLARY EMBODIMENTS

Figure 1:
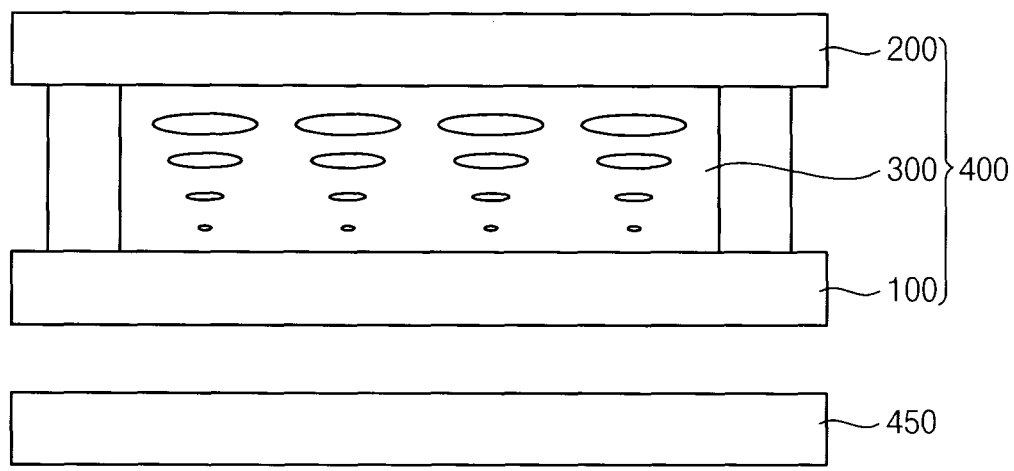
FIG. 1 is a cross-sectional view illustrating a display apparatus according to an exemplary embodiment of the present invention.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Like reference numerals refer to like elements throughout the accompanying drawings.

It will be understood that when an element or layer is referred to as being "on," "connected to" or "coupled to" another element or layer, it can be directly on, connected or coupled to the other element or layer or intervening elements or layers may be present. Hereinafter, exemplary embodiments of the present invention will be explained in detail with reference to the accompanying drawings.

Figure 2:
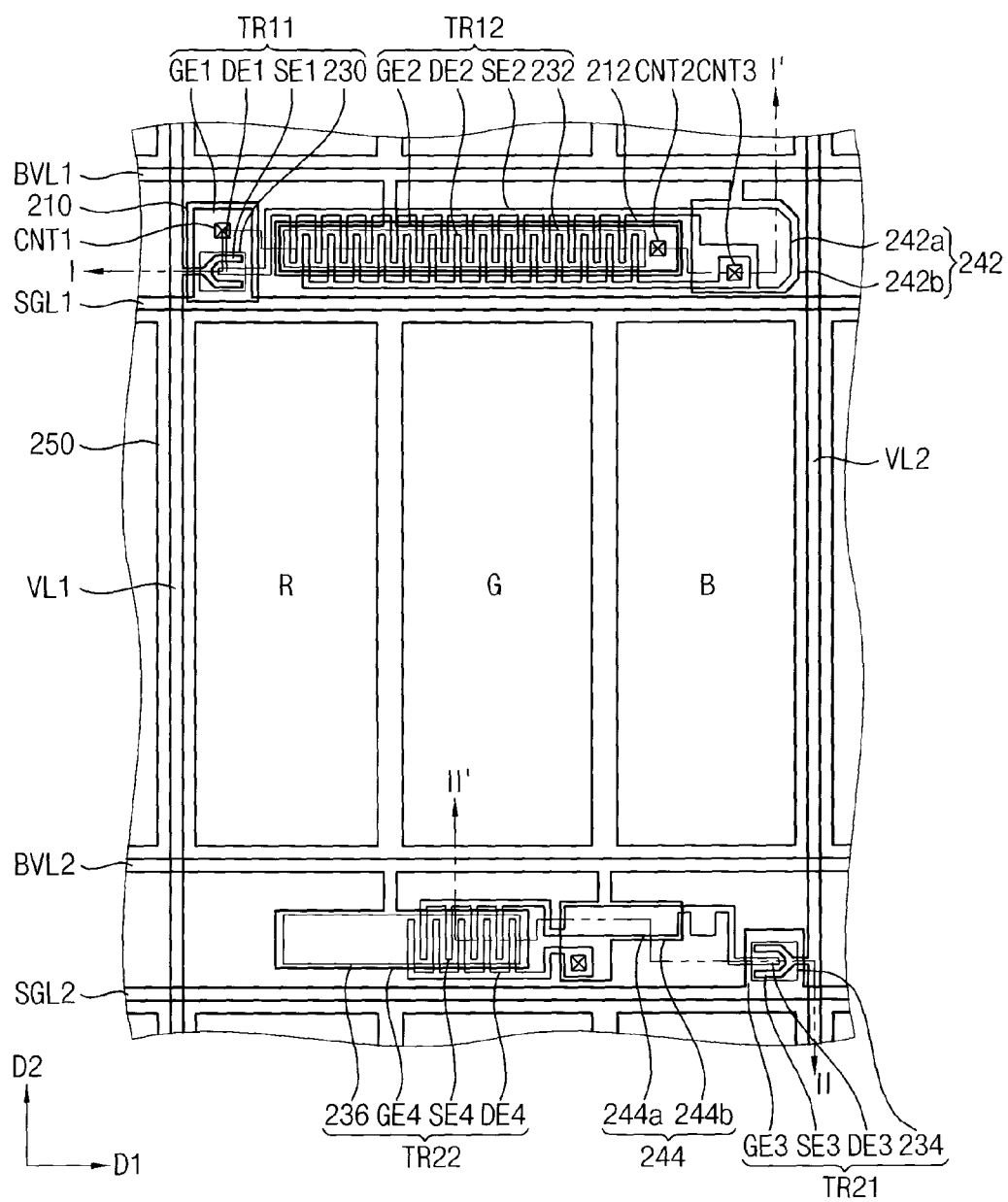
FIG. 2 is a plan view illustrating a second display substrate in FIG. 1.
Figure 3:
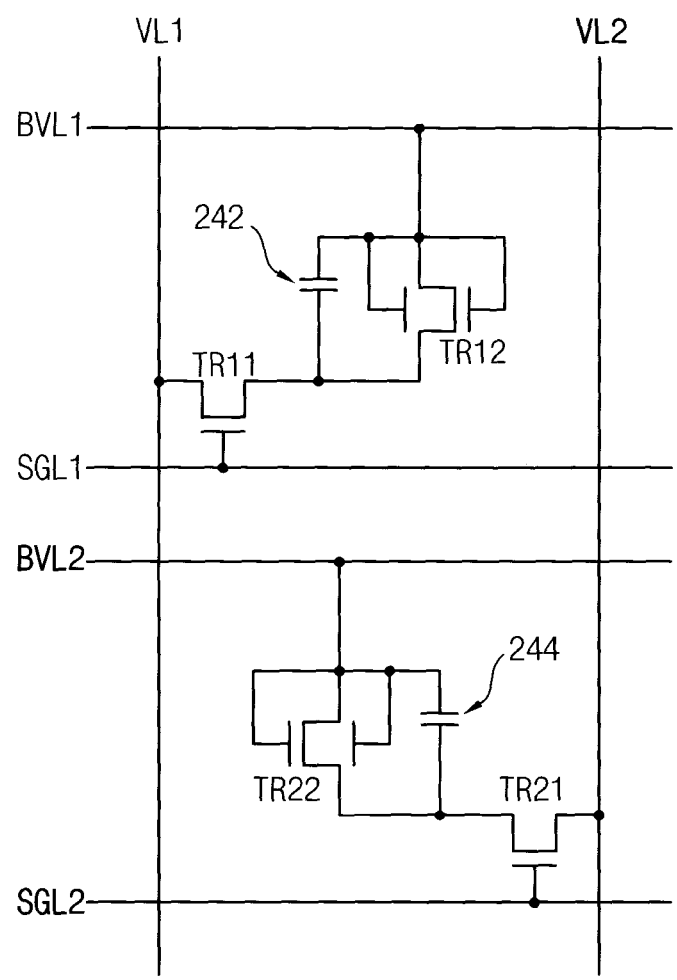
FIG. 3 is an equivalent circuit diagram of the second display substrate in FIG. 1.
Figure 4:
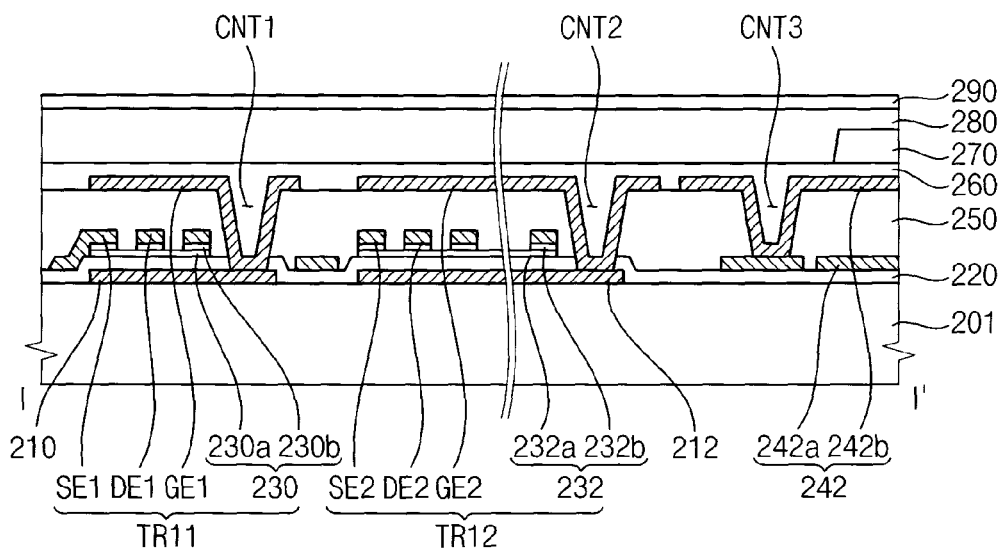
FIG. 4 is a cross-sectional view taken along line I-I' in FIG. 2.

FIG. 1 is a cross-sectional view illustrating a display apparatus according to an exemplary embodiment of the present invention. FIG. 2 is a plan view illustrating a second display substrate in FIG. 1. FIG. 3 is an equivalent circuit diagram of the second display substrate in FIG. 1. FIG. 4 is a cross-sectional view taken along line I-I' in FIG. 2.

Referring to FIGS. 1 to 4, a display apparatus 1000 according to an exemplary embodiment of the present invention includes a display panel 400 and a backlight assembly 450 providing light to the display panel 400.

The display panel 400 includes a first display substrate 100, a second display substrate 200 and a liquid crystal layer 300. The second display substrate 200 opposes the first display substrate 100. The liquid crystal layer 300 is interposed between the first and second display substrates 100 and 200.

The display panel 400 may function in an image scan mode and a touch mode. For example, when the display apparatus 1000 is in the image scan mode, the display panel 1000 scans the image displayed on the display panel 400. When the display apparatus 1000 is in the touch mode, the display apparatus 1000 detects a position of an object making contact with the display panel 400.

The second substrate 200 includes a base substrate 201, a first sensing gate line SGL1, a second sensing gate line SGL2, a first voltage line VL1, a second voltage line VL2, a first bias voltage line BVL1, a second bias voltage line BVL2, a first light blocking pattern 210, a second light blocking pattern 212, a gate insulating layer 220, a first switching element TR11, a first sensing element TR12 and a first capacitor 242.

The first sensing gate line SGL1 extends in a first direction D1 and applies a first sensing gate signal. The second sensing gate line SGL2 is disposed adjacent to the first sensing gate line SGL1 and applies a second sensing gate signal.

The first bias voltage line BVL1 extends in the first direction D1 and applies a first bias voltage. The second bias voltage line BVL2 is disposed adjacent to the first bias voltage line BVL1 and applies a second bias voltage.

The first voltage line VL1 extends in a second direction D2 to cross the first direction D1 and applies a first voltage. The second voltage line VL2 extends in the second direction D2 and is disposed adjacent to the first voltage line VL1. The second voltage line VL2 applies a second voltage.

The first light blocking pattern 210 may include a semiconductor material such as, for example, amorphous silicon germanium (a-SiGe). The first light blocking pattern 210 may be formed in a region corresponding to the first switching element TR11. The first light blocking pattern 210 transmits infrared light incident to the first switching element TR11 and absorbs, and thus blocks visible light.

The second light blocking pattern 212 may include a semiconductor material such as, for example, amorphous silicon germanium (a-SiGe). The second light blocking pattern 212 may be formed in a region corresponding to the first sensing element TR12. The second light blocking pattern 212 transmits the infrared light incident to the first sensing element TR12 and absorbs, and thus blocks the visible light.

The gate insulating layer 220 is formed on the base substrate 201 and the first and second light blocking patterns 210 and 212. The gate insulating layer 220 may include, for example, an inorganic insulation material.

The first switching element TR11 includes a first semiconductor pattern 230, a first source electrode SE1, a first drain electrode DE1 and a first gate electrode GE1.

The first semiconductor pattern 230 is formed on the gate insulating layer 220 and overlaps with the first light blocking pattern 210. The first semiconductor pattern 230 may include a first active layer 230a and a first ohmic contact layer 230b. The first active layer 230a may include, for example, amorphous silicon (a-Si). The first ohmic contact layer 230b may include, for example, amorphous silicon doped with n-type impurities of a high concentration (n+a-Si).

The first source and drain electrodes SE1 and DE1 are spaced apart from each other and are formed on the first semiconductor pattern 230. The first source electrode SE1 is connected to the first voltage line VL1 and receives the first voltage from the first voltage line VL1.

The second substrate 200 may further include a protection insulating layer 250. The protection insulating layer 250 is disposed on the base substrate 201 having the first source and drain electrodes SE1 and DE1. A first contact hole CNT1 exposing the first light blocking pattern 210 is formed through the protection insulating layer 250.

The first gate electrode GE1 is formed on the protection insulating layer 250. The first gate electrode GE1 is electrically connected to the first light blocking pattern 210 through the first contact hole CNT1. The first light blocking pattern 210 receives the first sensing gate signal through the first gate electrode GE1.

The first switching element TR11 may have a double gate structure including the first light blocking pattern 210 and the first gate electrode GE1. The first switching element TR11 transmits the first voltage to the first sensing element TR12 in response to a first sensing gate signal. The first sensing gate signal is applied to the first sensing gate line SGL1, and the first voltage is applied to the first voltage line VL1.

The first sensing element TR12 may detect a position of an object making contact with the display panel 400 using the infrared light. For example, the infrared light from the backlight assembly 450 is reflected from the object making contact with the display panel 400, and the reflected infrared light is provided to the first sensing element TR12. The first sensing element TR12 may detect the position of the object using the provided infrared light. The backlight assembly 450 may include a first light source generating the infrared light, and a second light source generating the visible light.

The first sensing element TR12 includes a second semiconductor pattern 232, a second source electrode SE2, a second drain electrode DE2 and a second gate electrode GE2.

The second semiconductor pattern 232 is formed on the gate insulating layer 220 and overlaps with the second light blocking pattern 212. The second semiconductor pattern 232 may include a second active layer 232a and a second ohmic contact layer 232b. The first active layer 232a may include, for example, amorphous silicon (a-Si). The second ohmic contact layer 232b may include, for example, amorphous silicon doped with n-type impurities of a high concentration (n+a-Si).

The second source electrode SE2 is formed on the second semiconductor pattern 232 and is connected to the first drain electrode DE1 of the first switching element TR11. The second source electrode SE2 may have an embossing structure having a repeated U-shape. A channel region of the first sensing element TR12 may be increased by implementing the repeated U-shape when forming the second source electrode SE2, thus, increasing the electrical mobility in the channel region. As a result, electrical characteristics of the first sensing element TR12 may be improved.

The second drain electrode DE2 is spaced apart from second source electrode SE2 on the second semiconductor pattern 232, and may have the embossing structure having the repeated U-shape, corresponding to the second source electrode SE2.

The second source and drain electrodes SE2 and DE2 are covered by the protection insulating layer 250. A second contact hole CNT2 exposing the second light blocking pattern 212 is formed through the protection insulating layer 250.

The second gate electrode GE2 is formed on the protection insulating layer 250. The second gate electrode GE2 is electrically connected to the second light blocking pattern 212 through the second contact hole CNT2. The second light blocking pattern 212 receives the bias voltage from the first bias voltage line BVL1 through the second gate electrode GE2.

The first sensing element TR12 may have a double gate structure including the second light blocking pattern 212 and the second gate electrode GE2.

The first capacitor 242 includes a first electrode 242a and a second electrode 242b. The first electrode 242a is electrically connected to the second source electrode SE2 of the first sensing element TR12. The second electrode 242b overlaps with the first electrode 242a and is electrically connected to the first bias voltage line BVL1. The protection insulating layer 250 is disposed between the first electrode 242a and the second electrode 242b.

The first capacitor 242 is electrically charged by a voltage between the first and second electrodes 242a and 242b. When the infrared light is received by the second active layer 232a of the first sensing element TR12, the electric charge stored at the first capacitor 242 is decreased according to the amount of infrared light received by the second active layer 232a. The electric charge stored at the first capacitor 242 is transmitted to a sensing signal process unit (not shown) that is connected to the display panel 400 through the first voltage line VL1. The first voltage line VL1 applies the first voltage to the first source electrode SE1 during an n-th frame, and outputs the electric charge stored at the first capacitor 242 to the sensing signal process unit during an (n+1)-th frame. The sensing signal process unit detects a touch position of an object making contact with the display panel 400 based on the amount of the electric charge stored at the first capacitor 242, and scans an image displayed on the display panel 400.

Figure 5:
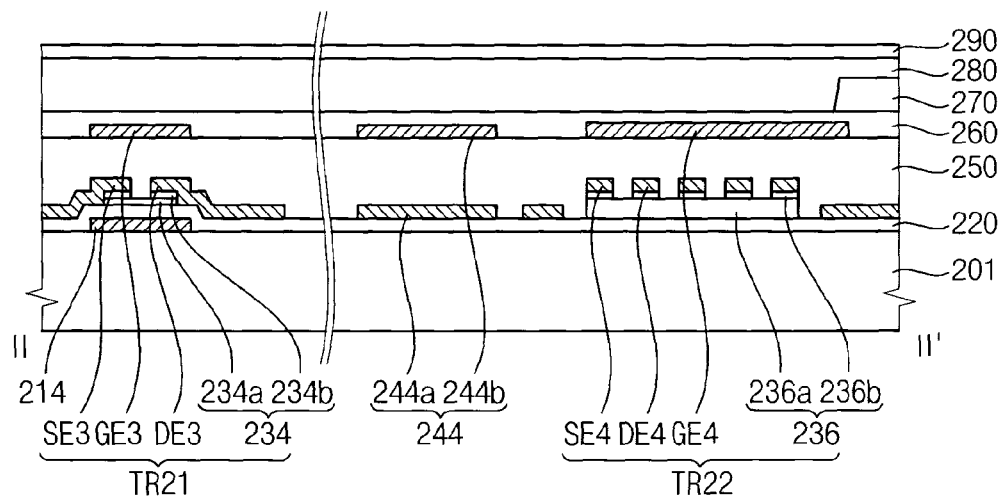
FIG. 5 is a cross-sectional view taken along line II-II' in FIG. 2.

FIG. 5 is a cross-sectional view taken along line II-II' in FIG. 2.

Referring to FIGS. 2 and 5, the second display substrate 200 may further include a third light blocking pattern 214, a second switching element TR21, a second sensing element TR22 and a second capacitor 244.

The third light blocking pattern 214 is disposed in a region corresponding to the second switching element TR21. The third light blocking pattern 214 blocks the infrared light and the visible light received at the second switching element TR21.

The second switching element TR21 is electrically connected to the second voltage line VL2 and the second sensing gate line SGL2.

The second switching element TR21 includes a third semiconductor pattern 234, a third source electrode SE3, a third drain electrode DE3 and a third gate electrode GE3.

The third semiconductor pattern 234 is formed on the gate insulating layer 220. The third semiconductor pattern 234 may have a double layer structure including a third active layer 234a and a third ohmic contact layer 234b. The third active layer 234a may include, for example, amorphous silicon (a-Si) and the third ohmic contact layer 234b may include, for example, amorphous silicon doped with n-type impurities of a high concentration (n+a-Si).

The third source electrode SE3 makes contact with the third ohmic contact layer 234b. The third source electrode SE3 is connected to the second voltage line VL2 and receives the second voltage from the second voltage line VL2. The third drain electrode DE3 is spaced apart from the third source electrode SE3.

The third gate electrode GE3 is formed on the protection insulating layer (250) and overlaps with the third source and drain electrodes SE3 and DE3.

The second switching element TR21 may have a top gate structure, wherein the third gate electrode GE3 is disposed over the third source and drain electrodes SE3 and DE3. The second switching element TR21 may include, for example, an amorphous silicon layer.

Using the visible light, the second sensing element TR22 scans an image of an object making contact with the display panel 400. For example, the second sensing element TR22 scans the image of an object using the visible light reflected from the object making contact with the display panel 400.

The second sensing element TR22 is electrically connected to the second switching element TR21. The second sensing element TR22 includes a fourth semiconductor pattern 236, a fourth source electrode SE4, a fourth drain electrode DE4 and a fourth gate electrode GE4.

The fourth semiconductor pattern 236 may have a double layer structure including a fourth active layer 236a and a fourth ohmic contact layer 236b. The fourth active layer 236a may include, for example, amorphous silicon (a-Si) and the fourth ohmic contact layer 236b may include, for example, amorphous silicon doped with n-type impurities of a high concentration (n+a-Si).

The fourth source electrode SE4 makes contact with the fourth ohmic contact layer 236b, and is electrically connected to the third drain electrode DE3 of the second switching element TR21.

The fourth drain electrode DE4 is spaced apart from the fourth source electrode SE4 on the fourth semiconductor pattern 236.

The fourth gate electrode GE4 is formed on the protection insulating layer 250 and overlaps with the fourth source and drain electrodes SE4 and DE4.

The second sensing element TR22 may have a top gate structure, wherein the fourth gate electrode GE4 is disposed over the fourth source and drain electrodes SE4 and DE4. The second sensing element TR22 may include, for example, an amorphous silicon layer.

The second capacitor 244 includes a first electrode 244a and a second electrode 244b. The first electrode 244a is electrically connected to the fourth source electrode SE4 of the second sensing element TR22. The second electrode 244b overlaps with the first electrode 244a and is electrically connected to the second bias voltage line BVL2. The protection insulating layer 250 is disposed between the first electrode 244a and the second electrode 244b.

The second capacitor 244 is electrically charged by a voltage between the first and second electrodes 244a and 244b. When the infrared light is received by the fourth active layer 236a of the second sensing element TR22, the electric charge stored at the second capacitor 244 is decreased according to the amount of infrared light received by the fourth active layer 236a. The electric charge stored at the second capacitor 244 is transmitted to the sensing signal process unit (not shown) that is connected to the display panel 400 through the second voltage line VL2. The second voltage line VL2 applies the second voltage to the third source electrode SE3 during an n-th frame, and outputs the electric charge stored at the second capacitor 244 to the sensing signal process unit during an (n+1)-th frame. The sensing signal process unit detects a touch position of an object making contact with the display panel 400 based on the amount of the electric charge stored at the second capacitor 244, and scans an image displayed on the display panel 400.

The second display substrate 200 may further include a black matrix 260, a color filter layer 270, an overcoating layer 280 and a common electrode 290.

The black matrix 260 is formed in boundary areas between pixel areas R, G and B defined on the base substrate 201, and prevents light leakage. The black matrix 260 is disposed over the first and second switching elements TR11 and TR21, the first and second sensing elements TR12 and TR22, and the first and second capacitors 242 and 244.

The color filter layer 270 is formed in the pixel areas R, G and B. The color filter layer 270 may include a red color filter, a green color filter and a blue color filter.

The overcoating layer 280 is formed on the color filter layer 270.

The common electrode 290 includes, for example, a transparent conductive material and is formed on the overcoating layer 280.

FIGS. 6A to 6D are cross-sectional views illustrating a method for manufacturing the second display substrate shown in FIG. 4.

Figure 6A:
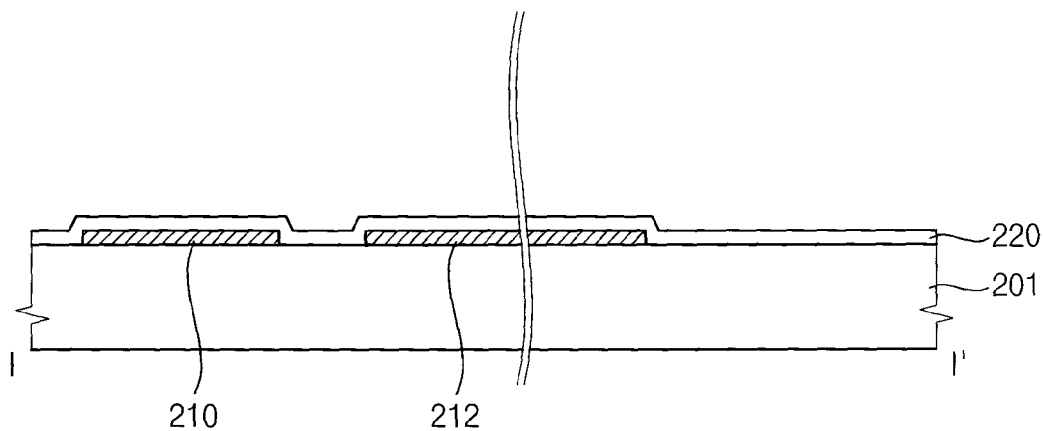
FIGS. 6A to 6D are cross-sectional views illustrating a method for manufacturing the second display substrate in FIG. 4.

Referring to FIGS. 4 and 6A, after forming a semiconductor layer including, for example, amorphous silicon germanium (a-SiGe) on the base substrate 201, the semiconductor layer is patterned to form a semiconductor pattern including the first and second light blocking patterns 210 and 212. The gate insulating layer 220 is formed on the base substrate 201 and the first and second light blocking patterns 210 and 212.

Figure 6B:
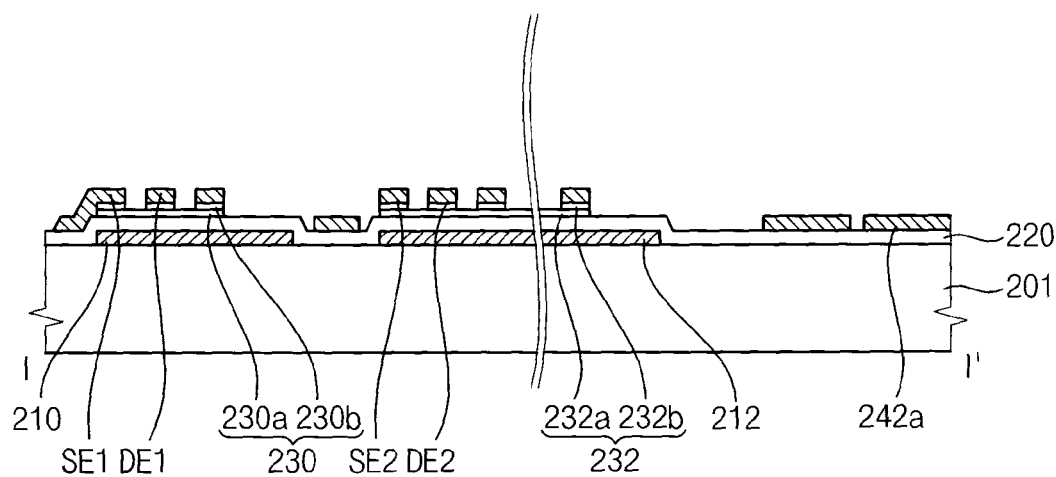

Referring to FIGS. 4 and 6B, an amorphous silicon layer and an n+ amorphous silicon layer are sequentially formed on the gate insulating layer 220. The n+ amorphous silicon layer may include, for example, amorphous silicon doped with n-type impurities of a high concentration. The amorphous silicon layer and the amorphous silicon layer may be disposed in a region corresponding to the first light blocking pattern 210 using a mask. The amorphous silicon layer and the n+ amorphous silicon layer are patterned to form the first semiconductor pattern 230 of the first switching element TR11. The first semiconductor pattern 230 may have a double layer structure including the first active layer 230a and the first ohmic contact layer 230b.

An amorphous silicon germanium layer and an n+ amorphous silicon germanium layer are sequentially formed in a region corresponding to the second light blocking pattern 212. The amorphous silicon germanium layer and the n+ amorphous silicon germanium layer are patterned to form the second semiconductor pattern 232 of the first sensing element TR12. The second semiconductor pattern 232 may have a double layer structure including the second active layer 232a and the second ohmic contact layer 232b.

A source metal layer is formed on the first and second semiconductor patterns 230 and 232. The source metal layer is patterned to form a source metal pattern. The source metal pattern includes the first and second voltage lines VL1 and VL2, the first source and drain electrodes SE1 and DE1 of the first switching element TR11, the second source and drain electrodes SE2 and DE2 of the first sensing element TR12, and the first electrode 242a of the first capacitor 242.

Figure 6C:
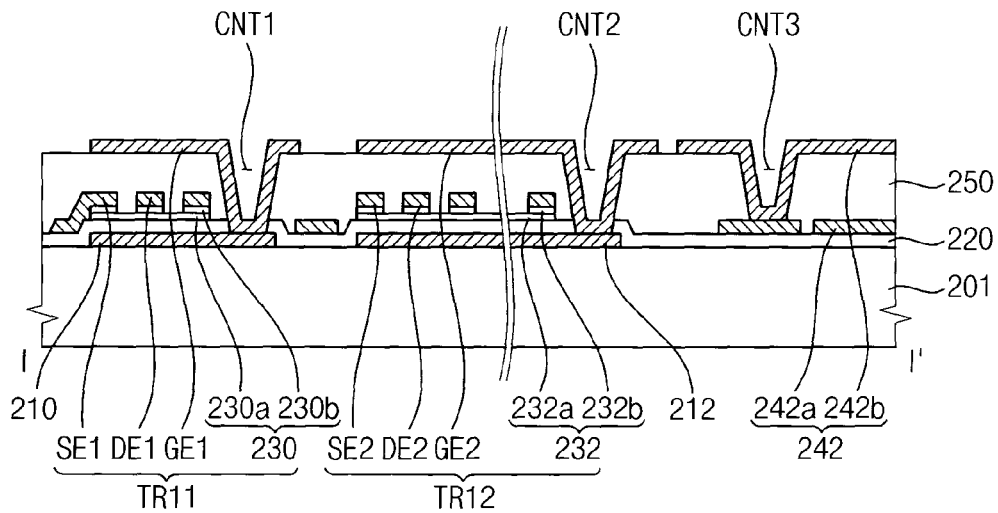

Referring to FIGS. 4 and 6C, after forming the protection insulating layer 250 on the source metal pattern formed on the base substrate 201, the protection insulating layer 250 is patterned to form the first contact hole CNT1 exposing the first light blocking pattern 210, the second contact hole CNT2 exposing the second light blocking pattern 212 and a third contact hole CNT3 exposing the second drain electrode DE2.

After forming a gate metal layer on the protection insulating layer 250, the gate metal layer is patterned to form a gate metal pattern. The gate metal pattern includes the first sensing gate line SGL1, the first gate electrode GE1 connected to the first sensing gate line SGL1, the first bias voltage line BVL1, the second gate electrode GE2 connected to the first bias voltage line BVL1 and the second electrode 242b of the first capacitor 242 connected to the first bias voltage line BVL1.

Figure 6D:
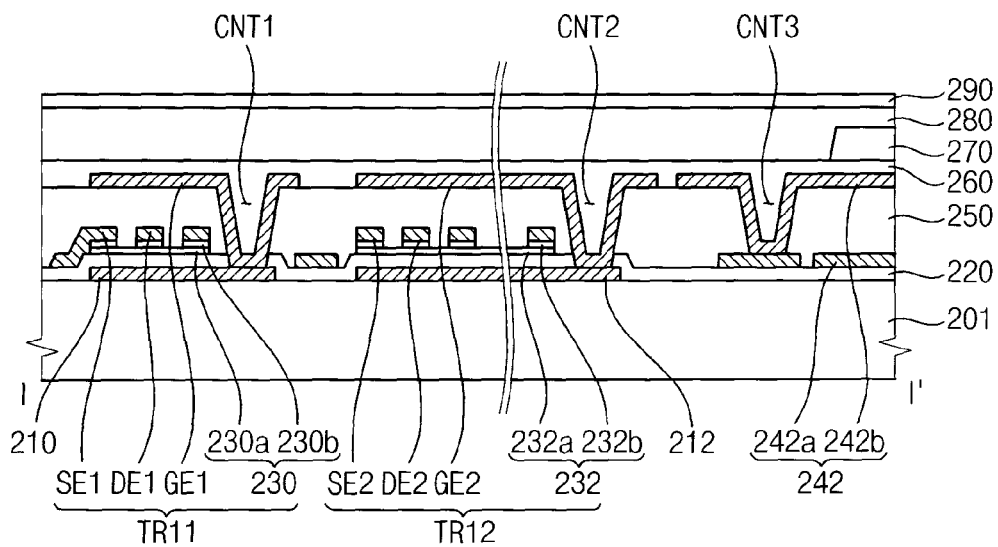

Referring to FIGS. 4 and 6D, the black matrix 260 is formed on the gate metal pattern formed on the protection insulating layer 250. The color filter layer 270 is formed on the black matrix 260. The overcoating layer 280 is formed on the color filter layer 270. The common electrode 290 is formed on the overcoating layer 280.

In the present exemplary embodiment, the first light blocking pattern 210 and the second gate electrode GE2 are electrically connected to the first bias voltage line BVL1, and receive the first bias voltage from the first bias voltage line BVL1, however, the present invention is not limited thereto. For example, the second display substrate 200 may further include a signal line different from the first bias voltage line BVL1, and each of the first light blocking pattern 210 and the second gate electrode GE2 may receive different signals from the first bias voltage line BVL1 and the signal line.

According to the present exemplary embodiment, the first switching element TR11 and the first sensing element TR12 may have a double gate structure, improving driving characteristics of the first sensing element TR11 and the first switching element TR12. In addition, the first and second light blocking patterns 210 and 212 may be formed of the same material. Thus, the number of masks used during manufacture of the display substrate may be decreased, simplifying the manufacturing process.

Figure 7:
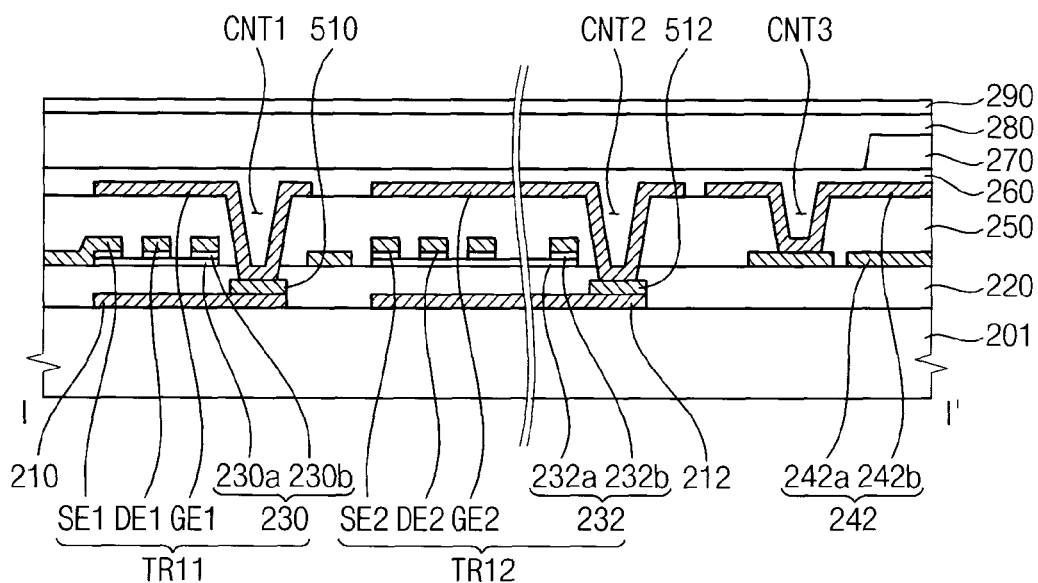
FIG. 7 is a cross-sectional view illustrating a second display substrate according to an exemplary embodiment of the present invention.

FIG. 7 is a cross-sectional view illustrating a second display substrate according to another exemplary embodiment of the present invention.

The second display substrate 500 according to the present exemplary embodiment is substantially similar to the second display substrate 200 described in the exemplary embodiment illustrated in FIG. 4, however, the second display substrate 500 according to the present exemplary embodiment further includes a first protection metal layer 510 and a second protection metal layer 512. Accordingly, the same reference numerals will be used to refer to the same elements as those described in reference to the exemplary embodiment illustrated in FIG. 4, and any repetitive description will be omitted.

Referring to FIG. 7, the second substrate 500 may include a first light blocking pattern 210, a second light blocking pattern 212, a first protection metal layer 510, a second protection metal layer 512, a first switching element TR11, a first sensing element TR12 and a first capacitor 242, which are formed on the base substrate 201.

The first protection metal layer 510 partially overlaps with the first light blocking pattern 210, and is spaced apart from the first semiconductor pattern 230 of the first switching element TR11. The first protection metal layer 510 prevents the first light blocking pattern 210 from being damaged while forming the first contact hole CNT1 through the protection insulating layer 250.

The second protection metal layer 512 partially overlaps with the second light blocking pattern 212, and is spaced apart from the second semiconductor pattern 232 of the first sensing element TR12. The second protection metal layer 512 prevents the second light blocking pattern 212 from being damaged while forming the second contact hole CNT2 through the protection insulating layer 250.

The first switching element TR11 includes a first semiconductor pattern 230, first source and drain electrodes SE1 and DE1, and a first gate electrode GE1. The first source and drain electrodes SE1 and DE1 are spaced apart from each other on the first semiconductor pattern 230. The first gate electrode GE1 overlaps with the first source and drain electrodes SE1 and DE1. The first gate electrode GE1 makes contact with the first protection metal layer 510 through the first contact hole CNT1. The first light blocking pattern 210 receives a first sensing gate signal from the first gate electrode GE1 through the first protection metal layer 510.

The first switching element TR11 may have a double gate structure including the first light blocking pattern 210 and the first gate electrode GE1. The first light blocking pattern 210 may function as a bottom gate electrode of the first switching element TR11, and may transmit the infrared light and absorb, and thus block the visible light.

The first sensing element TR12 includes a second semiconductor pattern 232, second source and drain electrodes SE2 and DE2, and a second gate electrode GE2. The second source and drain electrode SE2 and DE2 are spaced apart from each other on the second semiconductor pattern 232. The second gate electrode GE2 is disposed on the protection insulating layer 250 and in the second contact hold CNT2, and overlaps with the second source and drain electrodes SE2 and DE2. The second gate electrode GE2 makes contact with the second protection metal layer 512 through the second contact hole CNT2. The second light blocking pattern 212 receives a first bias voltage from the second gate electrode GE2 through the second protection metal layer 512.

The first sensing element TR12 may have a double gate structure including the second light blocking pattern 212 and the second gate electrode GE2. The second light blocking pattern 212 may function as the bottom gate electrode and may block visible light.

FIGS. 8A to 8E are cross-sectional views illustrating a method for manufacturing the second display substrate 500 shown in FIG. 7.

Figure 8A:
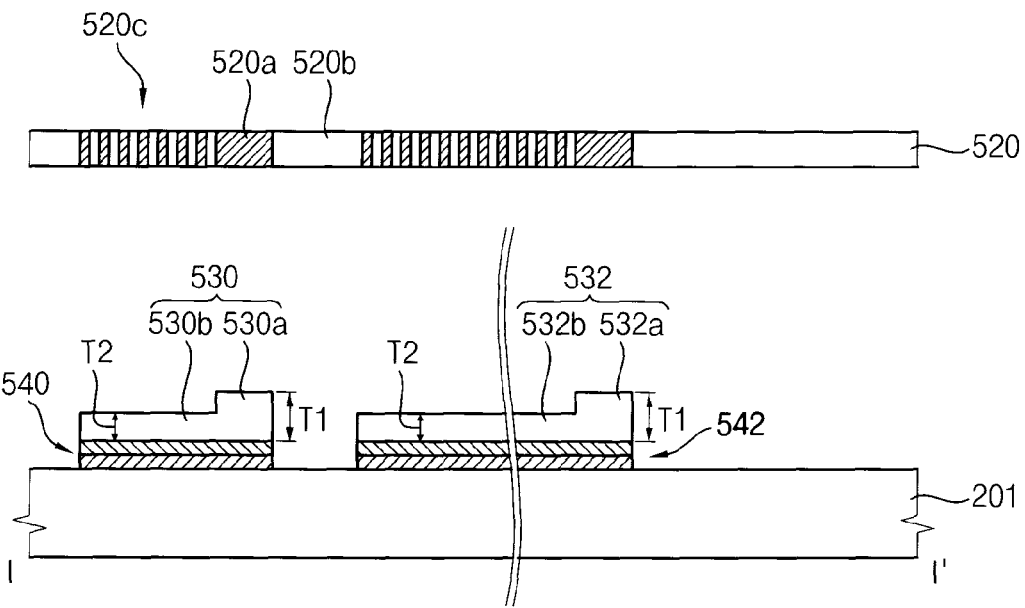
FIGS. 8A to 8E are cross-sectional views illustrating a method for manufacturing the second display substrate in FIG. 7.

Referring to FIGS. 7 and 8A, a semiconductor layer and a metal layer are sequentially formed on the base substrate 201. The semiconductor layer includes, for example, amorphous silicon germanium (a-SiGe). A photoresist layer is formed on the metal layer formed on the base substrate 201.

A mask 520 including a blocking portion 520a, a transmissive portion 520b and a transflective portion 520c is disposed over the photoresist layer formed on the base substrate 201. The photoresist layer is patterned using the mask 520 to form a first photo pattern 530 and a second photo pattern 532 on the base substrate 201. The semiconductor layer and the metal layer are etched using the first and second photo patterns 530 and 532 as an etching mask to form first and second metal patterns 540 and 542.

The first photo pattern 530 includes a first pattern 530a having a first thickness T1 and a second pattern 530b having a second thickness T2, which is less than the first thickness T1. The second photo pattern 532 includes a third pattern 532a having a thickness substantially the same as the first thickness T1 and a fourth pattern 532b having a thickness substantially the same as the second thickness T2.

The first and third patterns 530a and 532a are disposed over the first and second protection metal layers 510 and 512. The thickness of the second and fourth patterns 530b and 532b is less than the thickness of the first and third patterns 530a and 532a due to the slit patterns of the transflective portion 520c of the mask 520.

Figure 8B:
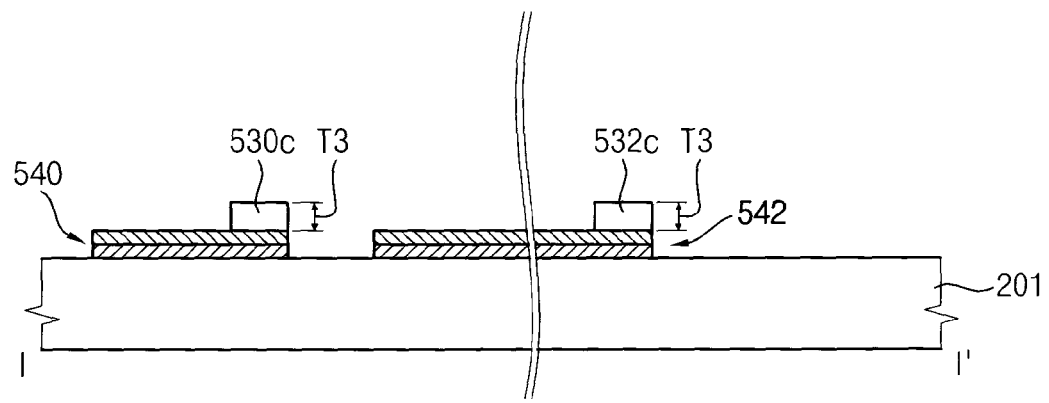

Referring to FIGS. 7 and 8B, the first and second photo patterns 530 and 532 are partially removed to form a fifth pattern 530c and a sixth pattern 532c, respectively. The fifth and sixth patterns 530c and 532c have a third thickness T3. The third thickness T3 may be substantially the same as the difference between the second thickness T2 and the first thickness T1.

The first metal pattern 540 is patterned using the fifth pattern 530c as an etching mask to form the first light blocking pattern 210 and the first protection metal layer 510. The first protection metal layer 510 partially overlaps with the first light blocking pattern 210 and is spaced apart from the first semiconductor pattern 230. The second metal pattern 542 is patterned using the sixth pattern 532c as an etching mask to form the second light blocking pattern 212 and the second protection metal layer 512.

The second protection metal layer 512 partially overlaps with the second light blocking pattern 212 and is spaced apart from the second semiconductor pattern 232.

Figure 8C:
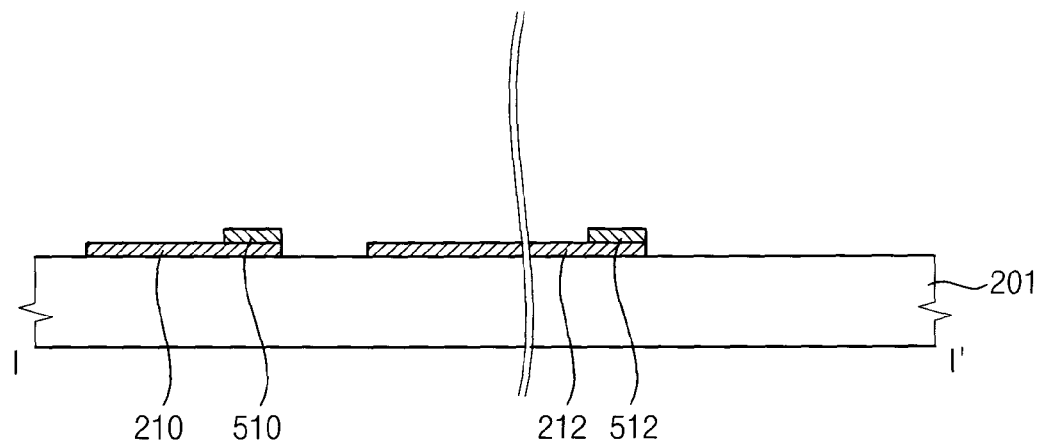

The fifth and sixth patterns 530c and 532c are removed. Accordingly, as shown in FIG. 8C, the first light blocking pattern 210, the first protection metal layer 510, the second light blocking pattern 212 and the second protection metal layer 512 are formed.

Figure 8D:
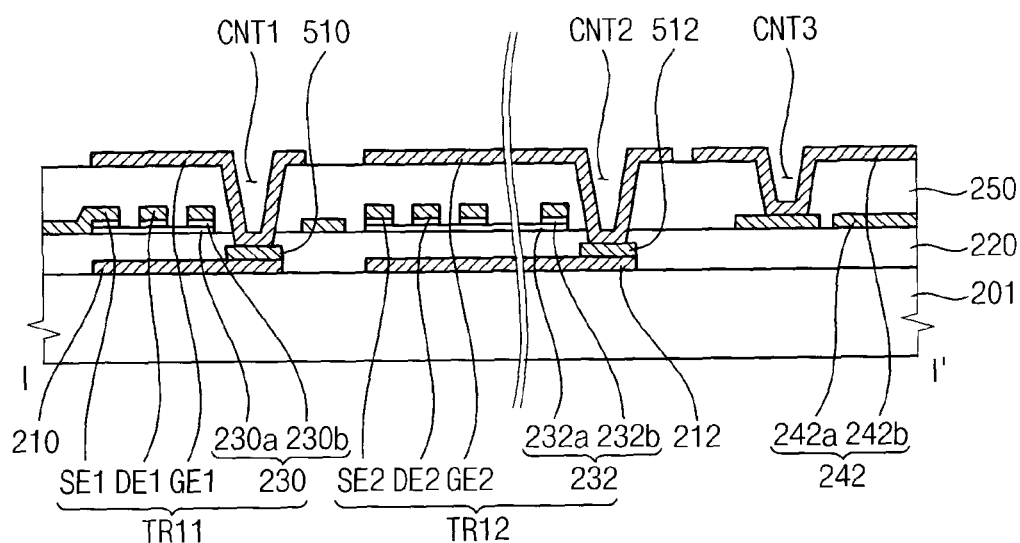

Referring to FIGS. 7 and 8D, the gate insulating layer 220 is formed on the base substrate 201, the first and second light blocking patterns 210 and 212, and the first and second protection metal layers 510 and 512. The first semiconductor pattern 230 of the first switching element TR11 and the second semiconductor pattern 232 of the first sensing element TR12 are sequentially formed on the gate insulating layer 220. For example, an amorphous silicon layer and an n+ amorphous silicon layer are sequentially formed on the gate insulating layer 220. The n+ amorphous silicon layer may include, for example, amorphous silicon doped with n-type impurities of a high concentration. The amorphous silicon layer and the n+ amorphous silicon layer may be disposed over the first light blocking pattern 210 using a mask. The amorphous silicon layer and the n+ amorphous silicon layer are patterned to form the first semiconductor pattern 230 of the first switching element TR11, which overlaps with the first light blocking pattern 210.

An amorphous silicon germanium layer and an n+ amorphous silicon germanium layer are sequentially formed over the second light blocking pattern 212. The amorphous silicon germanium layer and the n+ amorphous silicon germanium layer are patterned to form the second semiconductor pattern 232 of the first sensing element TR12. The second semiconductor pattern 232 may have a double layer structure including the second active layer 232a and the second ohmic contact layer 232b.

After forming a source metal layer on the gate insulating layer 220 and the first and second semiconductor patterns 230 and 232, the source metal layer is patterned to form a source metal pattern. The source metal pattern includes the first source and drain electrodes SE1 and DE1 of the first switching element TR11, the second source and drain electrodes SE2 and DE2 of the first sensing element TR12, and the first electrode 242a of the first capacitor 242.

The protection insulating layer 250 is formed on the source metal pattern, and the protection insulating layer 250 is patterned to form the first contact hole CNT1 exposing the first protection metal layer 510, the second contact hole CNT2 exposing the second protection metal layer 512 and a third contact hole CNT3 exposing the second drain electrode DE2.

A gate metal layer is formed on the protection insulating layer 250, and the gate metal layer is patterned to form a gate metal pattern. The gate metal pattern includes a first sensing gate line SGL1 applying a first sensing gate signal to the first light blocking pattern 210, the first gate electrode GE1 connected to the first sensing gate line, a first bias voltage line BVL1 applying a first bias voltage, the second gate electrode GE2 connected to the first bias voltage line, and the second electrode 242b of the first capacitor 242 connected to the first bias voltage line.

Figure 8E:
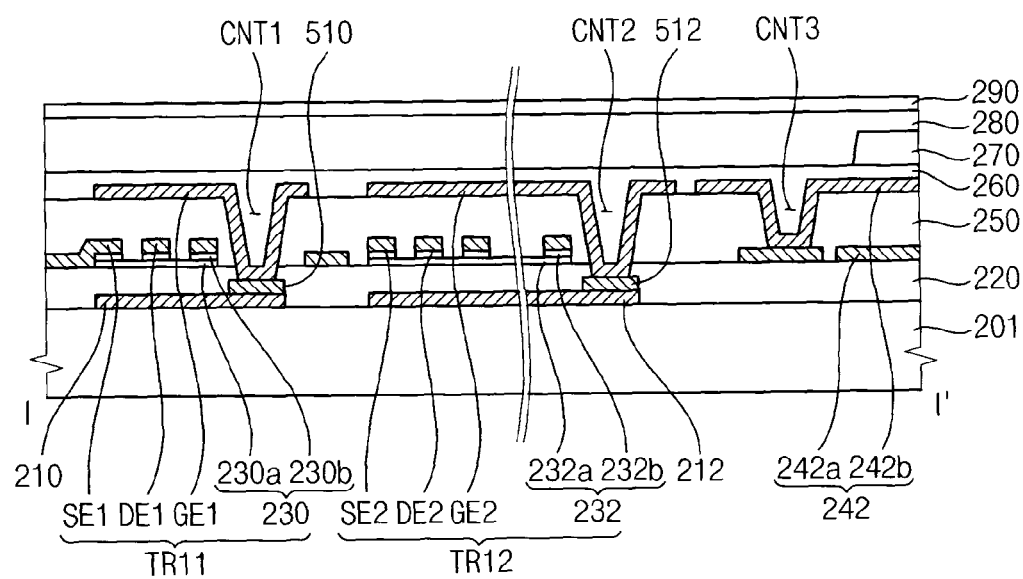

Referring to FIGS. 7 and 8E, a black matrix 260, a color filter layer 270, an overcoating layer 280 and a common electrode 290 are formed on the gate metal pattern formed on the protection insulating layer 250.

In the present exemplary embodiment, the second light blocking pattern 212 and the second gate electrode GE2 are electrically connected to the first bias voltage line BVL1, and receive the first bias voltage from the first bias voltage line BVL1, however, the present invention is not limited thereto. For example, the second display substrate 500 may further include a signal line different from the first bias voltage line BVL1, and each of the second light blocking pattern 212 and the second gate electrode GE2 may receive different signals from the first bias voltage line BVL1 and the signal line.

According to the present exemplary embodiment, the first and second protection metal layers 510 and 512 are formed on the first and second light blocking patterns 210 and 212, respectively. Thus, the first and second light blocking patterns 210 and 212 may be prevented from being damaged when the first and second contact holes CNT1 and CNT2 are formed through the protection insulating layer 250.

Figure 9:
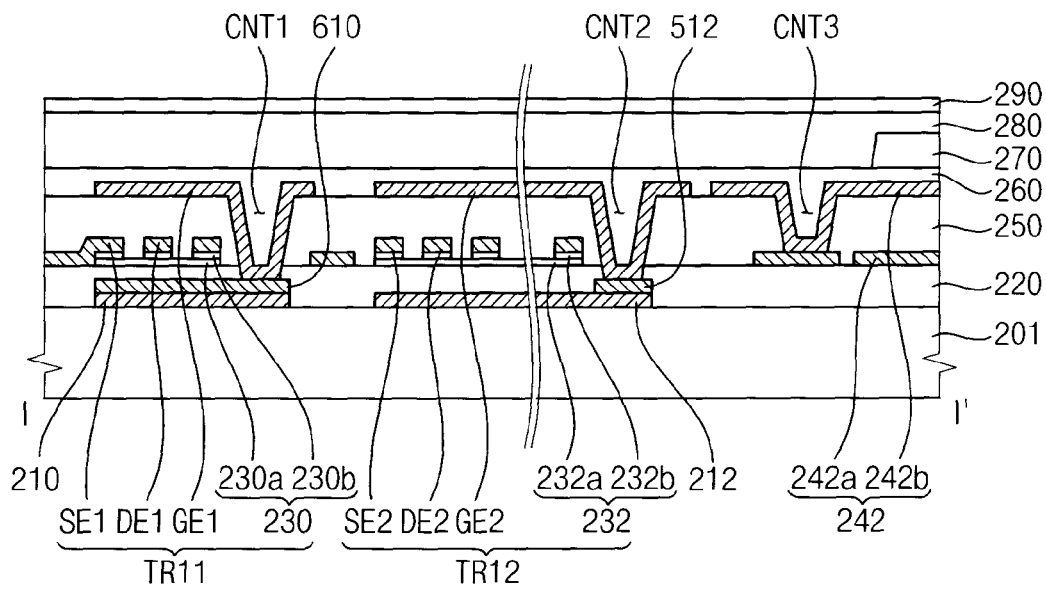
FIG. 9 is a cross-sectional view illustrating a second display substrate according to an exemplary embodiment of the present invention.

FIG. 9 is a cross-sectional view illustrating a second display substrate according to another exemplary embodiment of the present invention.

The second display substrate 600 according to the present exemplary embodiment is substantially similar to the second display substrate 500 described in the exemplary embodiment illustrated in FIG. 7, however, the second display substrate 600 according to the present exemplary embodiment further includes an electrode metal layer 610. Accordingly, the same reference numerals will be used to refer to the same elements as those described in reference to the exemplary embodiment illustrated in FIG. 7, and any repetitive description will be omitted.

Referring to FIG. 9, the second display substrate 600 may include a first light blocking pattern 210, a second light blocking pattern 212, the electrode metal layer 610, a second protection metal layer 512, a first switching element TR11, a first sensing element TR12 and a first capacitor 242 formed on the base substrate 201.

The electrode metal layer 610 overlaps with the first light blocking pattern 210 and the semiconductor pattern 230 of the first switching element TR11. The electrode metal layer 610 functions as a bottom gate electrode of the first switching element TR11. For example, the electrode metal layer 610 is connected to the first gate electrode GE1 as a top gate of the first switching element TR11 through the first contact hole CNT1, and receives a first sensing gate signal. In addition, the electrode metal layer 610 prevents the first light blocking pattern 210 from being damaged when the first contact hole CNT1 is formed through the protection insulating layer 250. Thus, the electrode metal layer 610 may function as a protection metal layer.

The second protection metal layer 512 partially overlaps with the second light blocking pattern 212, and is spaced apart from the second semiconductor pattern 232 of the first sensing element TR12. The second protection metal layer 512 prevents the second light blocking pattern 212 from being damaged when the second contact hole CNT2 is formed through the protection insulating layer 250.

The first switching element TR11 may include a first semiconductor pattern 230, first source and drain electrodes SE1 and DE1, and a first gate electrode GE1. The first source and drain electrodes SE1 and DE1 are spaced apart from each other on the first semiconductor pattern 230. The first gate electrode GE1 is disposed on the protection insulating layer 250 and in the first contact hold CNT1, and overlaps with the first source and drain electrodes SE1 and DEL The first gate electrode GE1 makes contact with the electrode metal layer 610 through the first contact hole CNT1. The first switching element TR11 may have a double gate structure including the electrode metal layer 610 and the first gate electrode GE1. The electrode metal layer 610 functions as a bottom gate electrode, and the first gate electrode GE1 functions as a top gate electrode.

The first sensing element TR12 may include a second semiconductor pattern 232, second source and drain electrodes SE2 and DE2, and a second gate electrode GE2. The second source and drain electrodes SE2 and DE2 are spaced apart from each other on the second semiconductor pattern 232. The second gate electrode GE2 is disposed on the protection insulating layer 250 and in the second contact hold CNT2, and overlaps with the second source and drain electrodes SE2 and DE2. The second gate electrode GE2 makes contact with the second protection metal layer 512 through the second contact hole CNT2. The first sensing element TR12 may have a double gate structure including the second light blocking pattern 212 and the second gate electrode GE2, and the second light blocking pattern 212 may have a function of a bottom gate electrode and a function of blocking visible light.

A method for manufacturing the second display substrate 600 according to the present exemplary embodiment is substantially similar to the method according to the exemplary embodiment described in FIGS. 8A to 8E, however, the electrode metal layer 610 in the present exemplary embodiment substantially overlaps with the first light blocking pattern 210. Thus, any repetitive description will be omitted.

A semiconductor layer including, for example, amorphous silicon germanium (a-SiGe) and a metal layer are substantially formed on the base substrate 201, and the semiconductor layer and the metal layer are patterned to form a photo pattern (not shown). The photo pattern may include a first photo pattern and a second photo pattern. The first photo pattern is disposed over the electrode metal layer 610 and the first light blocking pattern 210, and the second photo pattern is disposed over the second protection metal layer 512 and the second light blocking pattern 212. The second photo pattern is substantially the same as the first photo pattern 530 in FIG. 8A. For example, the second photo pattern includes a first pattern (530a of FIG. 8A) having a first thickness T1 and a second pattern (530b of FIG. 8A) having a second thickness less than the first thickness T1. The thickness of the first photo pattern is substantially the same as the first thickness T1. Accordingly, the electrode metal layer 610 substantially overlaps with the first light blocking pattern 210, and the second protection metal layer 512 partially overlaps with the second light blocking pattern 212.

In the present exemplary embodiment, the electrode metal layer 610 and the second gate electrode GE2 are electrically connected to the first bias voltage line BVL1 and receive the first bias voltage from the first bias voltage line BVL1, however, the present invention is not limited thereto. For example, the second display substrate 600 may further include a signal line different from the first bias voltage line BVL1, and each of the electrode metal layer 610 and the second gate electrode GE2 may receive different signals from the first bias voltage line BVL1 and the signal line.

According to the present exemplary embodiment, the first switching element TR11 includes the electrode metal layer 610 having a metal material as the bottom gate electrode, improving driving characteristics of the first switching element TR11.

Figure 10:
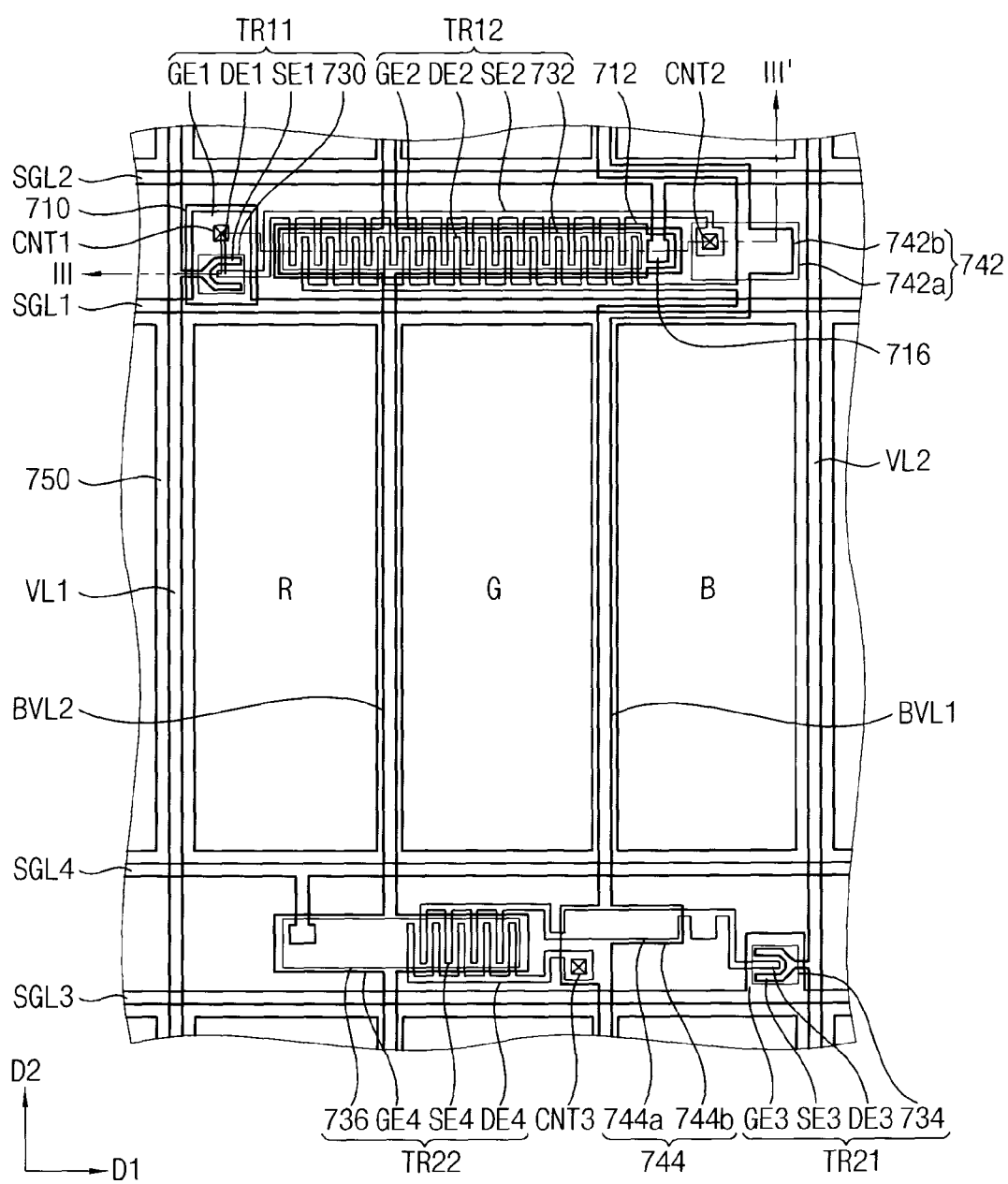
FIG. 10 is a plan view illustrating a second display substrate according to an exemplary embodiment of the present invention.
Figure 11:
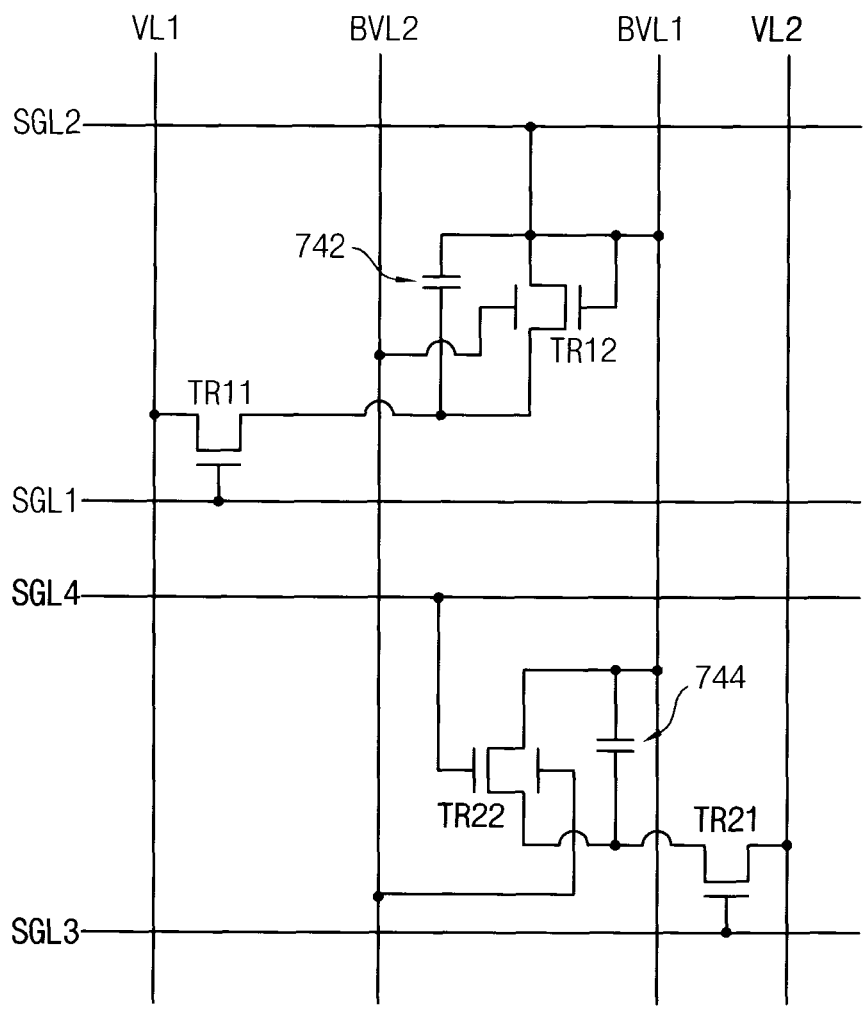
FIG. 11 is an equivalent circuit diagram of the second display substrate in FIG. 10.
Figure 12:
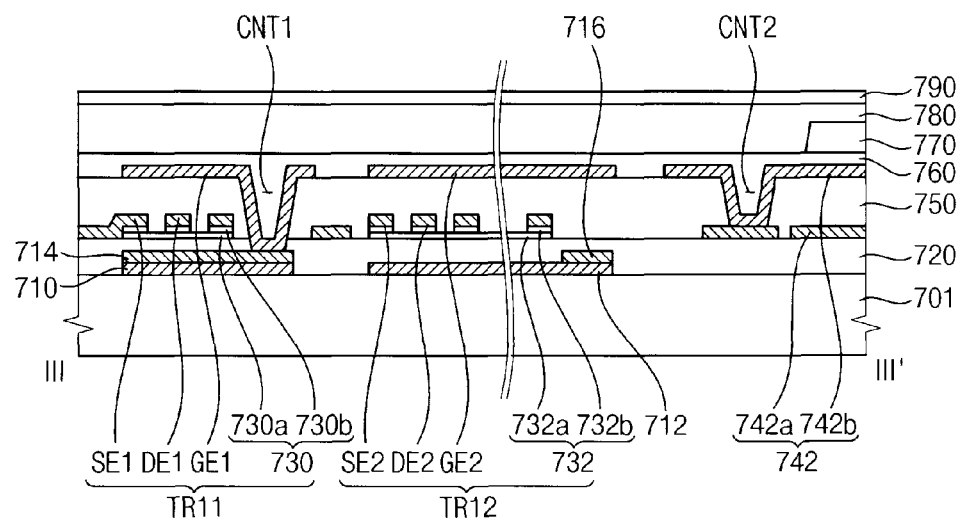
FIG. 12 is a cross-sectional view taken along line in FIG. 10.

FIG. 10 is a cross-sectional view illustrating a second display substrate according to another exemplary embodiment of the present invention. FIG. 11 is an equivalent circuit diagram of the second display substrate shown in FIG. 10. FIG. 12 is a cross-sectional view taken along line III-III' in FIG. 10.

Referring to FIGS. 10 to 12, a display substrate 700 according to the present exemplary embodiment may include a base substrate 701, a first sensing gate line SGL1, a second sensing gate line SGL2, a first voltage line VL1, a second voltage line VL2, a first bias voltage line BVL1, a second bias voltage line BVL2, a first light blocking pattern 710, a second light blocking pattern 712, an electrode metal layer 714, an electrode pad layer 716, a gate insulating layer 720, a first switching element TR11, a first sensing element TR12 and a first capacitor 742.

As shown in FIG. 10, the first sensing gate line SGL1 extends in a first direction D1 and applies a first sensing gate signal. The second sensing gate line SGL2 is disposed adjacent to the first sensing gate line SGL1 and applies a second sensing gate signal.

The first voltage line VL1 extends in a second direction D2 crossing the first direction D1 and applies a first voltage. The second voltage line VL2 is disposed adjacent to the first voltage line VL1 and applies a second voltage.

The first bias voltage line BVL1 extends in the second direction D2 and applies a first bias voltage. The second bias voltage line BVL2 is disposed adjacent to the first bias voltage line BVL1 and applies a second bias voltage.

The first light blocking pattern 710 may include amorphous silicon germanium (a-SiGe). The first light blocking pattern 710 transmits infrared light and absorbs, and thus blocks visible light incident to the first switching element TR11. The first light blocking pattern 710 is electrically connected to the first sensing gate line SGL1 and receives the first sensing gate signal from the first sensing gate line SGL1.

The second light blocking pattern 712 may include amorphous silicon germanium (a-SiGe). The second light blocking pattern 712 transmits infrared light and absorbs, and thus blocks visible light incident to the first sensing element TR12. The second light blocking pattern 712 is electrically connected to the first bias voltage line BVL1 and receives the first bias voltage from the first bias voltage line BVL1.

The electrode metal layer 714 overlaps with the first light blocking pattern 710 and the first semiconductor pattern 730 of the first switching element TR11. The electrode metal layer 714 functions as a bottom gate electrode of the first switching element TR11. For example, the electrode metal layer 714 is connected to the first gate electrode GE1 as a top gate of the first switching element TR11 through a first contact hole CNT1, and receives the first sensing gate signal. In addition, the electrode metal layer 714 prevents the first light blocking pattern 710 from being damaged when the first contact hole CNT1 is formed through the protection insulating layer 750. Thus, the electrode metal layer 714 may function as a protection metal layer.

The electrode pad layer 716 partially overlaps with the second light blocking pattern 712 and is spaced apart from the second semiconductor pattern 732 of the first sensing element TR12. The electrode pad layer 716 may be omitted in an exemplary embodiment of the second display substrate 700.

The gate insulating layer 720 covers the electrode metal layer 714 and the electrode pad layer 716. The gate insulating layer 720 may include, for example, an inorganic insulation material.

The first switching element TR11 may include a first semiconductor pattern 730, first source and drain electrodes SE1 and DE1, and a first gate electrode GE1.

The first semiconductor pattern 730 overlaps with the electrode metal layer 714. The first semiconductor pattern 730 may include a first active layer 730a including, for example, amorphous silicon (a-Si), and a first ohmic contact layer 730b including, for example, amorphous silicon doped with n-type impurities of a high concentration (n+ a-Si).

The first source and drain electrodes SE1 and DE1 are formed on the first semiconductor pattern 730 and are spaced apart from each other. The first source electrode SE1 is connected to the first voltage line VL1 and receives the first voltage from the first voltage line VL1. The protection insulating layer 750 is disposed on the first source and drain electrodes SE1 and DE1 and the gate insulating layer 720.

The gate electrode GE1 overlaps with the first source and drain electrodes SE1 and DE1. The first contact hole CNT1 is formed through the protection insulating layer 750 to expose the electrode metal layer 714. The gate electrode GE1 is electrically connected to the electrode metal layer 714 through the first contact hole CNT1.

The first switching element TR11 may include a double gate structure including the electrode metal layer 714 and the first gate electrode GE1.

The first sensing element TR12 detects a position of an object making contact with the second display substrate 700 using infrared light. The first sensing element TR12 includes a second semiconductor pattern 732, second source and drain electrodes SE2 and DE2, and a second gate electrode GE2.

The second semiconductor pattern 732 overlaps with the second light blocking pattern 712. The second semiconductor pattern 732 includes a second active layer 732a including, for example, amorphous silicon (a-Si), and a second ohmic contact layer 732b including, for example, amorphous silicon doped with n-type impurities of a high concentration (n+a-Si).

The second source electrode SE2 makes contact with the second ohmic contact layer 732b on the second semiconductor pattern 732, and is electrically connected to the first drain electrode DE1 of the first switching element TR11. The second source electrode SE2 may have an embossing structure having a repeated U-shape. A channel region of the first sensing element TR12 may be increased by implementing the repeated U-shape when forming the second source electrode SE2, thus, increasing the electrical mobility in the channel region. As a result, electrical characteristics of the first sensing element TR12 may be improved.

The second drain electrode DE2 is spaced apart from the second source electrode SE2 on the second semiconductor pattern 732, and may have the embossing structure having the repeated U-shape, corresponding to the second source electrode SE2.

The second gate electrode GE2 overlaps with the second source and drain electrodes SE2 and DE2. The second gate electrode GE2 is electrically connected to the second bias voltage line BVL2 and receives the second bias voltage from the second bias voltage line BVL2.

The first sensing element TR12 may have a double gate structure including the second light blocking pattern 712 and the second gate electrode GE2. A photocurrent corresponding to light detected by the first sensing element TR12 is applied to the first capacitor 742.

The first capacitor 742 includes a first electrode 742a and a second electrode 742b. The first electrode 742a is electrically connected to the second bias voltage line BVL2 and the drain electrode DE2 of the first sensing element TR12. The second electrode 742b is electrically connected to the second source electrode SE2 of the first sensing element TR12 through the second contact hole CNT2 formed through the protection insulating layer 750.

The first capacitor 742 is electrically charged by a voltage between the first and second electrodes 742a and 742b. When the infrared light is received by the second active layer 732a of the first sensing element TR12, the electric charge stored at the first capacitor 742 is decreased according to the amount of infrared light received by the second active layer 732a. The electric charge stored at the first capacitor 742 is transmitted to a sensing signal process unit (not shown) that is connected to the display panel 400 through the first voltage line VL1. The first voltage line VL1 applies the first voltage to the first source electrode SE1 during an nth frame, and outputs the electric charge stored at the first capacitor 742 to the sensing signal process unit during an (n+1)-th frame. The sensing signal process unit detects a touch position of an object making contact with the display panel 400 based on the amount of the electric charge stored at the first capacitor 742, and scans an image displayed on the display panel 400.

The second display substrate 700 may further include a third sensing gate line SGL3, a fourth sensing gate line SGL4, a second switching element TR21, a second sensing element TR22 and a second capacitor 744.

As shown in FIG. 10, the third sensing gate line SGL3 extends in the first direction D1 and applies a third sensing gate signal. The fourth sensing gate line SGL4 is disposed adjacent to the third sensing gate line SGL3 and applies a fourth sensing gate signal.

The second switching element TR21 is electrically connected to the second voltage line VL2 and the third sensing gate line SGL3. The second switching element TR21 includes a third semiconductor pattern 734, a third source electrode SE3, a third drain electrode DE3 and a third gate electrode GE3. The third semiconductor pattern 734 may have a double layer structure having an active layer, including, for example, amorphous silicon (a-Si), and an ohmic contact layer including, for example, amorphous silicon doped with n-type impurities of a high concentration (n+ a-Si). The third source electrode SE3 is connected to the second voltage line VL2, and the third drain electrode DE3 is spaced apart from the third source electrode SE3. The third gate electrode GE3 overlaps with the third source and drain electrodes SE3 and DE3. The second switching element TR21 may have a top gate structure wherein the third gate electrode GE3 is disposed over the third source and drain electrodes SE3 and DE3. The second switching element TR21 may include, for example, an amorphous silicon layer.

In an exemplary embodiment of the present invention, the second display substrate 700 may further include a third light blocking pattern (not shown). The third light blocking pattern may be disposed under the gate insulating layer 720 in a region corresponding to the second switching element TR21. The third light blocking pattern blocks the infrared light and the visible light incident to the second switching element TR21.

The second sensing element TR22 scans an image of an object making contact with the display substrate 700 using the visible light.

The second sensing element TR22 is electrically connected to the second switching element TR21. The second sensing element TR22 includes a fourth semiconductor pattern 736, fourth source and drain electrodes SE4 and DE4, and a fourth gate electrode GE4. The fourth semiconductor pattern 736 may have a double layer structure having a fourth active layer 736a including, for example, amorphous silicon (a-Si), and a fourth ohmic contact layer 736b including, for example, amorphous silicon doped with n-type impurities of a high concentration (n+ a-Si). The fourth source electrode SE4 is connected to the third drain electrode DE3 of the second switching element TR21, and the fourth drain electrode DE4 is spaced apart from the fourth source electrode SE4. The fourth gate electrode GE4 overlaps with the fourth source and drain electrodes SE4 and DE4. The second sensing element TR22 may have a top gate structure wherein the fourth gate electrode GE4 is disposed over the fourth source and drain electrodes SE4 and DE4. The second sensing element TR22 may include, for example, an amorphous silicon layer.

The second capacitor 744 includes a first electrode 744a and a second electrode 744b. The first electrode 744a is electrically connected to the third drain electrode DE3 of the second switching element TR21 and the second electrode 744b is electrically connected to the first bias voltage line BVL1. The first capacitor 744 is electrically charged by a voltage between the first and second electrodes 744a and 744b. When the infrared light is received by the fourth active layer 736a of the second sensing element TR22, the amount of the electric charge stored at the second capacitor 744 is decreased according to the amount of infrared light received by the fourth active layer 736a. The electric charge stored at the second capacitor 744 is transmitted to the sensing signal process unit (not shown) that is connected to the second display substrate 700 through the second voltage line VL2. The second voltage line VL2 applies the second voltage to the third source electrode SE3 during an n-th frame, and outputs the electric charge stored at the second capacitor 744 to the sensing signal process unit during a (n+1)-th frame. The sensing signal process unit detects a touch position of an object making contact with the display panel 400 based on the amount of the electric charge stored at the second capacitor 744, and scans an image displayed on the display panel 400.

The second display substrate 700 may include a black matrix 760, a color filter layer 770, an overcoating layer 780 and a common electrode 790.

The black matrix 760, the color filter layer 770, the overcoating layer 780 and the common electrode 790 are sequentially formed on the protection insulating layer 750.

FIGS. 13A to 13E are cross-sectional views illustrating a method for manufacturing the second display substrate shown in FIG. 12.

Figure 13A:
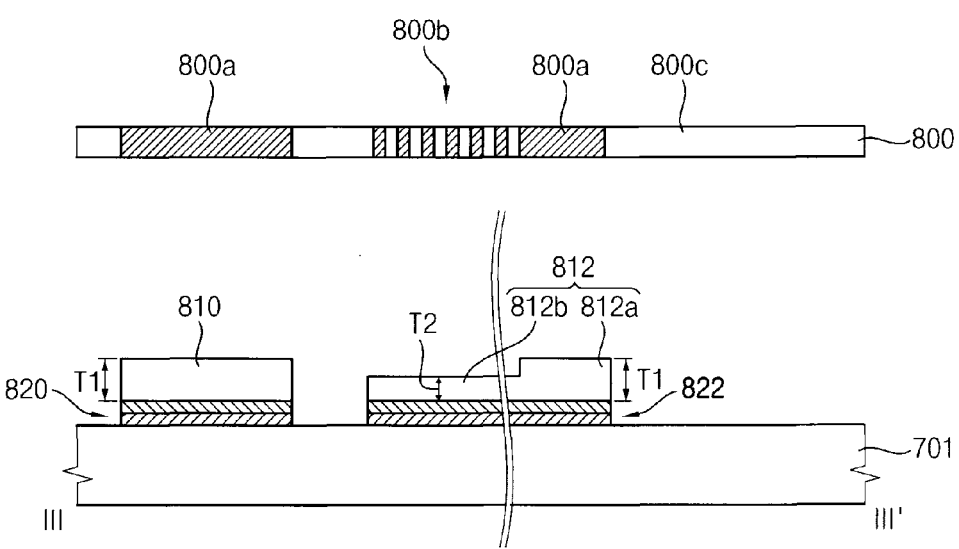
FIGS. 13A to 13E are cross-sectional views illustrating a method for manufacturing the second display substrate in FIG. 12.

Referring to FIGS. 12 and 13A, a semiconductor layer including, for example, amorphous silicon germanium (a-SiGe) and a metal layer are substantially formed on the base substrate 701. A photoresist layer is formed on the metal layer formed on the base substrate 701.

A mask 800 including a blocking portion 800a, a transflective portion 800b and a transmissive portion 800c is disposed on the photoresist layer formed on the base substrate 701. The photoresist layer is patterned using the mask 800 to form a first photo pattern 810 and a second photo pattern 812 on the base substrate 701. A first metal pattern 820 and a second metal pattern 822 are formed on the base substrate 701 using the first and second photo patterns 810 and 812.

The first photo pattern 810 has a first thickness T1. The second photo pattern 812 includes a first pattern 812a having the first thickness T1 and a second pattern 812b having a second thickness T2, which is less than the first thickness T1. The thickness of the second pattern 812b is less than the thickness of the first pattern 812a due to the slit pattern of the transflective portion 800b of the mask 800.

Figure 13B:
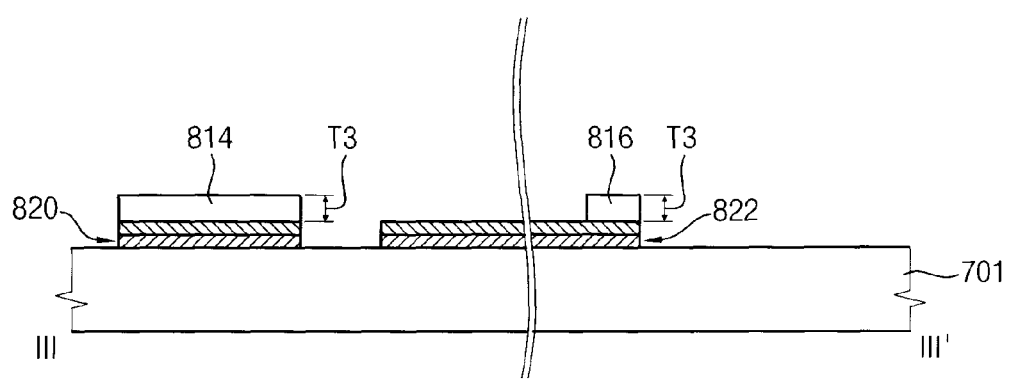

Referring to FIGS. 12 and 13B, the first and second photo patterns 810 and 812 are partially removed to form a third pattern 814 and a fourth pattern 816. Each of the third and fourth patterns 814 and 816 may have a thickness substantially the same as a third thickness T3. The third thickness T3 may be substantially the same as the difference between the second thickness T2 and the first thickness T1.

Figure 13C:
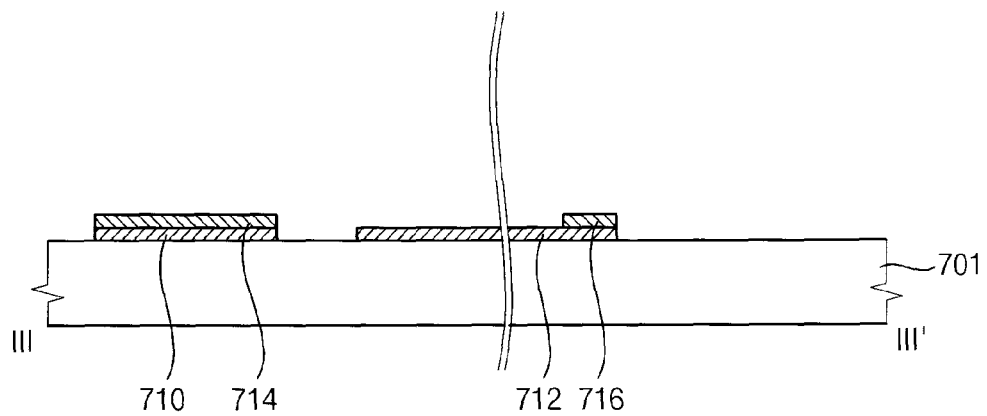

The first and second metal pattern 820 and 822 are etched using the third and fourth photo patterns 814 and 816, and the third and fourth photo patterns 814 and 816 are removed. Accordingly, as shown in FIG. 13C, the first light blocking pattern 710 and the electrode metal layer 714 substantially overlap, and the second light blocking pattern 712 and the electrode pad layer 716 partially overlap.

Figure 13D:
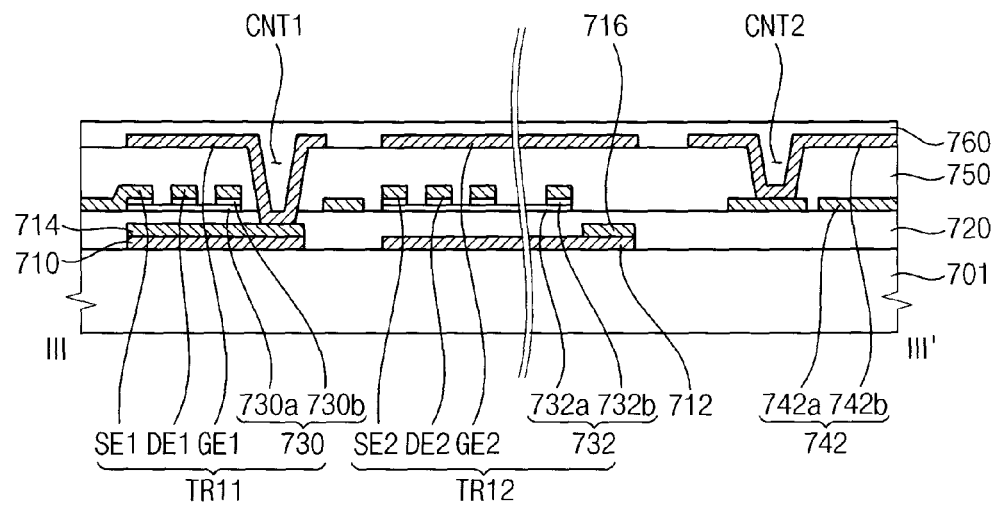

Referring to FIGS. 12 and 13D, the gate insulating layer 720 is formed on the base substrate 701, the electrode metal layer 714, and the electrode pad layer 716. The first semiconductor pattern 730 of the first switching element TR11 and the second semiconductor pattern 732 of the first sensing element TR12 are sequentially formed on the gate insulating layer 220.

A source metal layer is formed on the first and second semiconductor patterns 730 and 732, and the source metal layer is patterned to form a source metal pattern. The source metal pattern includes the first and second voltage lines VL1 and VL2, the first source and drain electrodes SE1 and DE1 of the first switching element TR11, the second source and drain electrodes SE2 and DE2 of the first sensing element TR12, and the first electrode 742a of the first capacitor 742.

The protection insulating layer 750 is formed on the protection insulating layer 750 and is patterned to form the first contact hole CNT1 exposing the electrode metal layer 714, and the second contact hole CNT2 exposing the second source electrode SE2.

After forming a gate metal layer on the protection insulating layer 750, the gate metal layer is patterned to form a gate metal pattern. The gate metal pattern includes the first sensing gate line SGL1, the first gate electrode GE1 connected to the first sensing gate line SGL1, the first bias voltage line BVL1, the second gate electrode GE2 connected to the first bias voltage line BVL1 and the second electrode 742b of the first capacitor 742 connected to the first bias voltage line BVL1. The black matrix 760 is formed on the gate metal.

Figure 13E:
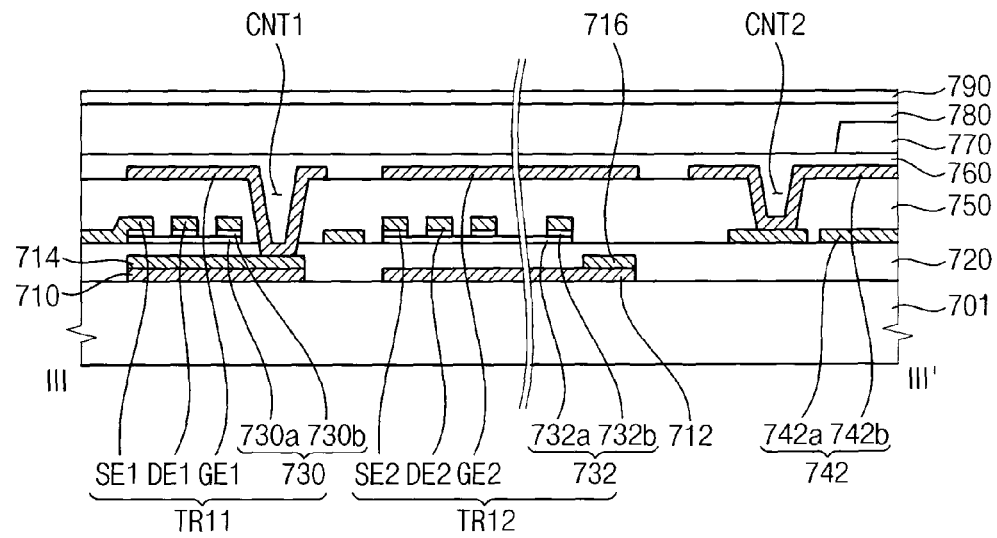

Referring to FIGS. 12 and 13E, the color filter layer 770, the overcoating layer 780 and the common electrode 790 are formed on the black matrix 760.

In the present exemplary embodiment, the second light blocking pattern 712 receives the first sensing signal from the second sensing gate line SGL2, and the second gate electrode GE2 receives the first bias voltage from the first bias voltage line BVL1, however, the present invention is not limited thereto. For example, the second light blocking pattern 712 and second gate electrode GE2 may be electrically connected to a single signal line and receive the same signal from the single signal line. Thus, in an exemplary embodiment, the number of signal lines may be decreased.

In the present exemplary embodiment, the first and second light blocking patterns 710 and 712, the electrode metal layer 714 and the electrode pad layer 716 may be formed using one mask.

According to an exemplary embodiment of the present invention, the sensing element and the switching element may have a double gate structure, improving the driving characteristics of the sensing and switching elements. The bottom gate electrodes of the sensing and switching elements may include substantially the same material. Thus, the number of masks used during the manufacturing process may be decreased.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. A display substrate comprising:
  a first light blocking pattern formed on a base substrate, configured to block visible light and transmit infrared light;
  a first switching element comprising a first semiconductor pattern, a first source electrode, a first drain electrode, and a first gate electrode, wherein the first semiconductor pattern is formed on the first light blocking pattern, the first source and drain electrodes are formed on the first semiconductor pattern, and the first gate electrode is formed on the first source and drain electrodes;

a second light blocking pattern formed on the base substrate, configured to block the visible light and transmit the infrared light; and a first sensing element configured to detect the infrared light, comprising a second semiconductor pattern, a second source electrode, a second drain electrode, and a second gate electrode, wherein the second semiconductor pattern is formed on the second light blocking pattern, the second source and drain electrodes are formed on the second semiconductor pattern, and the second gate electrode is formed on the second source and drain electrodes.

2. The display substrate of claim 1, further comprising:

a first voltage line extending in a first direction and configured to apply a first voltage to the first source electrode;

a first sensing gate line extending in a second direction substantially perpendicular to the first direction and configured to apply a first sensing gate signal to the first gate electrode;

a first bias voltage line disposed adjacent to the first sensing gate line and configured to apply a first bias voltage to the second gate electrode; and a first capacitor comprising a first electrode and a second electrode, wherein the first electrode is electrically connected to the second source electrode, the second electrode is electrically connected to the first bias voltage line, and an electric charge stored at the first capacitor corresponds to an amount of the infrared light detected by the first sensing element.

3. The display substrate of claim 2, further comprising:

a protection insulating layer formed on the first source electrode, the first drain electrode, the second source electrode, and the second drain electrode, wherein the protection insulating layer comprises a first contact hole exposing the first light blocking pattern, and the first gate electrode is disposed on the protection insulating layer and is electrically connected to the first light blocking pattern through the first contact hole.

4. The display substrate of claim 3, wherein the protection insulating layer further comprises a second contact hole exposing the second light blocking pattern, and the second gate electrode is formed on the protection insulating layer and is electrically connected to the second light blocking pattern through the second contact hole.

5. The display substrate of claim 2, further comprising a second sensing gate line, extending in the second direction substantially perpendicular to the first direction, electrically connected to the second light blocking pattern and configured to apply a second sensing gate signal to the second gate electrode.

6. The display substrate of claim 1, further comprising:

a first protection metal layer formed on the first light blocking pattern and configured to protect the first light blocking pattern during an etching process; and a second protection metal layer formed on the second light blocking pattern and configured to protect the second light blocking pattern during the etching process.

7. The display substrate of claim 2, further comprising an electrode metal layer formed on the first light blocking pattern, wherein the electrode metal layer substantially overlaps with the first light blocking pattern.

8. The display substrate of claim 7, further comprising an electrode pad layer formed on the second light blocking pattern, wherein the electrode pad layer partially overlaps with the second light blocking pattern.

9. The display substrate of claim 2, further comprising:

a second sensing element configured to detect the visible light;

a third light blocking pattern formed on the base substrate, configured to block the visible light and the infrared light; and a second switching element formed on the third light blocking pattern and electrically connected to the second sensing element.

10. The display substrate of claim 9, further comprising:

a second voltage line extending in the first direction, electrically connected to a source electrode of the second switching element, and configured to apply a second voltage to the source electrode of the second switching element;

a second sensing gate line extending in the second direction substantially perpendicular to the first direction, electrically connected to a gate electrode of the second switching element, and configured to apply a second sensing gate signal to the gate electrode of the second switching element;

a second bias voltage line disposed adjacent to the second sensing gate line, electrically connected to a gate electrode of the second sensing element, and configured to apply a second bias voltage to the gate electrode of the second sensing element; and a second capacitor comprising a first electrode and a second electrode, wherein the first electrode is electrically connected to a source electrode of the second sensing element, the second electrode is electrically connected to the second bias voltage line, and an electric charge stored at the second capacitor corresponds to an amount of the visible light detected by the second sensing element.

11. The display substrate of claim 1, wherein the first light blocking pattern, the second light blocking pattern, and the first semiconductor pattern comprise a first semiconductor material, and the second semiconductor pattern comprises a second semiconductor material different from the first semiconductor material.

* * * * *